Aug. 15, 1961
R. O. BELL
2,995,855
FISHING ROD HOLDER
Filed July 15, 1958
2 Sheets-Sheet 1
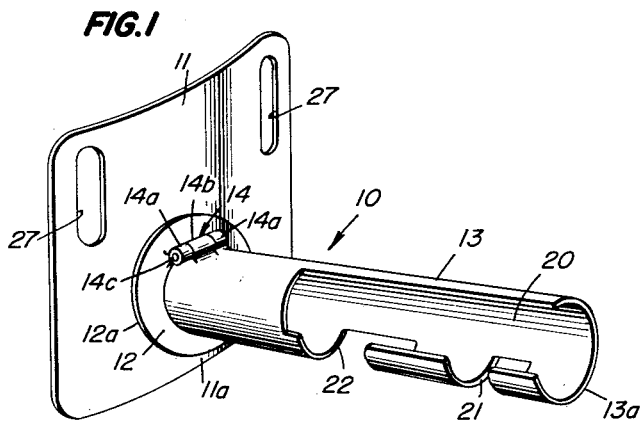
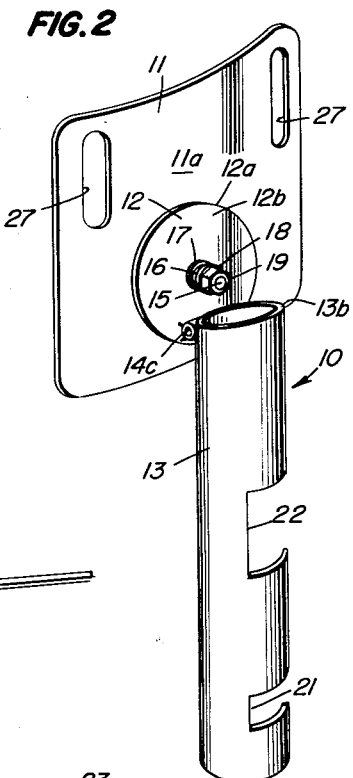
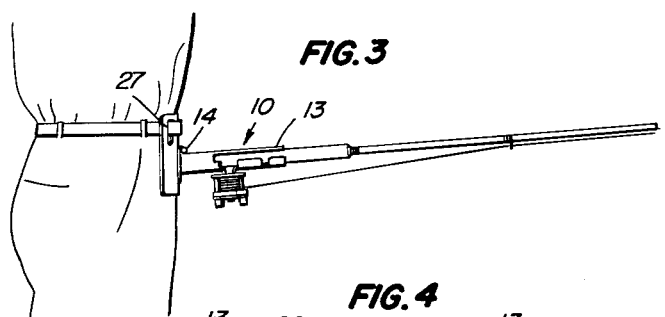
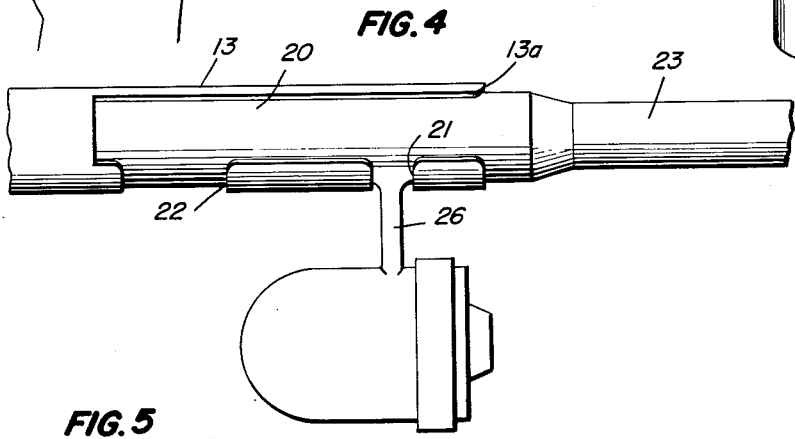
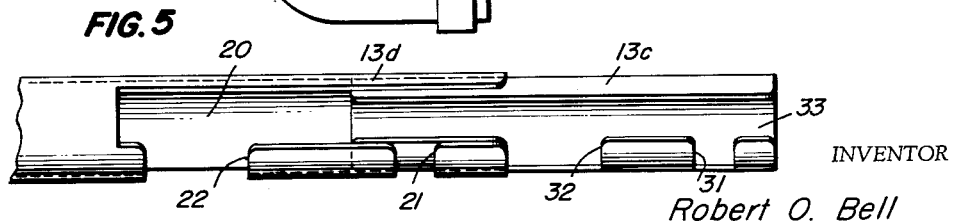
INVENTOR
Robert O. Bell
BY
ATTORNEY Aug. 15, 1961    R. O. BELL    2,995,855
FISHING ROD HOLDER
Filed July 15, 1958    2 Sheets-Sheet 2

INVENTOR
Robert O. Bell
BY *John B. Hunnicutt*
ATTORNEY

United States Patent Office 2,995,855
Patented Aug. 15, 1961

2,995,855
FISHING ROD HOLDER
Robert O. Bell, 273 Downington Ave.,
Salt Lake City, Utah
Filed July 15, 1958, Ser. No. 748,695
6 Claims. (Cl. 43—21.2)

This invention relates to fishing equipment and in particular to an improved fishing rod holder.

An object of this invention is the provision of a practical and highly useful fishing rod holder with rod receiving means which may be set from an unobtrusive down position to an up position of the rod receiving means so that the rod may be effectively supported in fishing position, and which rod receiving means may be returned to the down position whenever desired.

Another object is the provision of a fishing rod holder of the character indicated which includes a rod holding socket member operatively connected to a support member of the holder so that by suitably mounting the support member the socket member too is mounted and yet is adjustable between up and down positions.

Another object is that of providing a fishing rod holder of the character indicated in which the socket member of the holder is rotatably connected to the support member so as to achieve rotation between the up and down positions, the socket member in the up position being very effectively supported in cantilever fashion and yet is rotatable to a substantially vertical out of the way position.

A further object of the invention is the provision of a fishing rod holder of the character indicated in which the rod receiver is positively restrained against rotation from the up position to the down position.

A still further object is that of providing a fishing rod holder of the character indicated which can be satisfactorily attached to the body of a fisherman so as to be useful, while attached, for supporting a fishing rod thus relieving the fisherman of the burden of keeping a grip on the rod at all times with his hands, and which holder when not in use can be adjusted to an out of the way position so as to be worn quite easily, and comfortably within reach of the wearer.

Another object of this invention is the provision of a fishing rod holder for supporting a fishing rod in an up position, and in which a portion of the holder engaging the rod is hingedly movable between a corresponding up position and higher positions, thus allowing the fisherman to play the rod back and forth above the up position of the rod while fishing.

Another object is the provision of a fishing rod holder with which the fishing rod may be supported in an up position, and in which a portion of the holder engaging the rod is pivotally movable between a corresponding up position and a down position and hingedly movable between the corresponding up position and higher positions.

A further object is the provision of a fishing rod holder in which the rod and holder are positively interlocked, by aid of the reel mounting, to prevent inadvertent axial escape of the rod.

Another object is that of providing a fishing rod holder which is well suited to receive and secure rods equipped with any of a variety of reels, such as fly casting reels, spinning reels, or the like, and which functions satisfactorily with each reel.

Other objects of the invention in part will be obvious and in part pointed out more fully hereinafter.

The invention accordingly consists in the several components, combination of elements, and products, the scope of the application of which is indicated in the following claims.

In the accompanying drawing, representing preferred embodiments of a fishing rod holder constructed in accordance with the present invention:

FIGURE 1 is a perspective view of the holder in its up position for receiving a fishing rod;

FIGURE 2 is a perspective view of the holder in its out-of-the-way or down position with a section cut away showing details of the rod socket mounting;

FIGURE 3 is a view of the holder in its up position as worn by a fisherman and having inserted in it a rod carrying a conventional fly casting reel;

FIGURE 4 is a view of the rod receiving socket portion of the holder in the preceding figures, further representing that the rod being used carries a spinning reel;

FIGURE 5 is a detail view of a rod receiving portion of the holder, modified so that the receiving portion includes several sections telescoped together;

Figure 6:
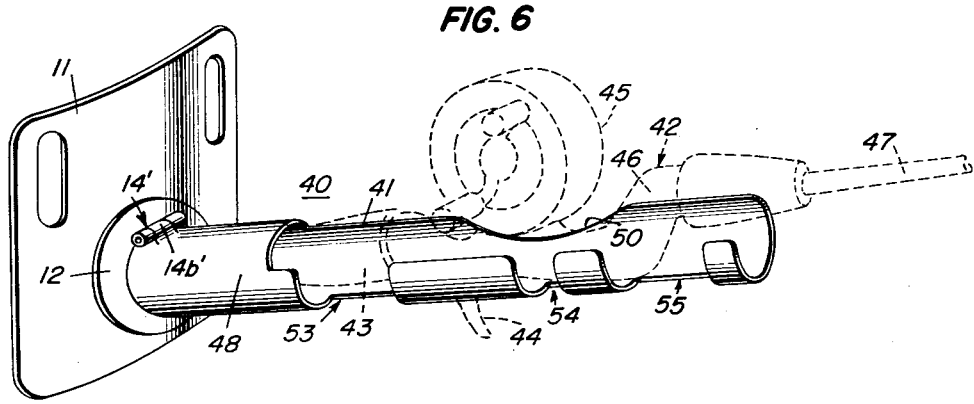
FIGURE 6 is a perspective view of a modified holder in accordance with the present invention.

As conducive to a clearer understanding of certain features of the present invention, it may be noted at this point that rods to which lines are attached for catching fish have long been used by sportsmen and commercial fishermen as hand implements, and a reel for the line usually is situated on the rod within reach from the handle end. In accordance with some practices the rod is either held in the hand by the user, or after the line has been cast into the water, the rod sometimes is propped against an object such as a large rock along the bank of the stream or against the rail of a boat until a fish strikes the hook. This of course allows the fisherman more freedom; still there are occasions where the rod and valuable equipment attached to it are lost into the water or the rod is tripped over because of disorderly placement. Of course many acts directly associated with fishing require manual dexterity and freedom of movement, such as removing and replacing a lure, baiting a hook, attaching a leader to a fishing line, removing the catch, untangling a line fouled in the reel or at an anchor point along the length of the rod, and often these and other such operations introduce the problem of what to do with the rod so that the operations may be more easily accomplished. Other acts, performed in conjunction with fishing, may likewise make it difficult to keep the rod within full grasp, such as lighting and smoking a cigarette, reaching and opening a tackle box, or adjusting an article of clothing. When, therefore, a fisherman encounters need for a free hand or hands, or for other reasons wishes to relinquish hold on the rod, there are many advantages to having the rod still adequately supported.

Rod holders heretofore have been introduced for positively attaching the rod such as to the gunwale of a boat or to the body of the fisherman, and in kind have offered particular advantages to the fisherman, including the provision of at least partial support for the rod or the avoidance of the need for all times grasping the rod with the hands. Holders which are attached to the body of the fisherman, as with the aid of a belt, are sometimes useful for supporting rods during such endeavors as fresh water or surf fishing, where for example the fisherman has waded out beyond shore and the rod being employed importantly is retained so as not to become separated from the fisherman.

An outstanding object of the present invention is the provision of fishing rod holders which overcome certain disadvantages of holders already known in the prior art by offering structural and functional advantages and, as fishing equipment, very well serve the intended use.

Referring now more particularly to FIGURES 1, 2, and 3 of the accompanying drawing, a fishing rod holder generally designated 10, is depicted as having a substantially vertical support plate 11 of approximately rectangular configuration. Plate 11 is provided with oblong apertures 27 on opposite sides of the plate near the top edge and these apertures are of a size which will accommodate a leather belt 28 or the like which encircles the waist of a fisherman to hold the plate in place as will be seen more clearly by referring to FIGURE 3 of the drawing. As an alternative, of course, plate 11 may be secured to a suitable mounting such as by screws introduced through the openings 27 and for that matter a form of support other than plate 11 is sometimes employed.

It will also be noted that the holder 10 further includes a cylindrical generally tubular element 13 which serves as a receiver for the butt end of the fishing rod. The rod is introduced endwise so that the handle of the rod is substantially coaxially situated with respect to the longitudinal axis of the member 13. The cylindrical tubular member has an inner end which is equipped with a hinge 14 having a portion 14b extending from the cylindrical wall of the receiver and the hinge has a pin 14c which provides a hinge axis offset from the longitudinal axis of the receiver 13 and lateral to the axis of the receiver. A corresponding portion 14a of the hinge is united with a rotatable carrier plate 12 for the tubular element 13. Carrier plate 12 is pivotally connected to the substantially vertical support 11 by a connector such as in the form of a bolt 15 having its head seated against the face of plate 11 opposite to that which is visible in FIGURE 2. Bolt 15 affords an axis for the tubular member 13 and this axis is offset from the axis of hinge 14 and lateral to the axis of the hinge. Carrier plate 12 has an aperture 17 which accommodates bolt 15 and on the shank of the bolt is a helical spring 16 covered at its outer end by a washer 18 and retained in place by a nut 19 engaging the threads of the bolt. Thus spring 16 exerts a biasing force against carrier plate 12 and forces this plate against the substantially vertical support 11. Support 11 and carrier 12 have confronting faces 11a and 12a respectively, and these faces are of cylindrical configuration and to register with and interengage each other when the carrier plate is rotated in either direction to 180 degree opposite positions. As shown, support 11 is a substantially cylindrical plate having a concave face which very conveniently conforms to the curvature of the thigh of the fisherman and the opposite face 12a of the plate has a convex curvature corresponding to a concave curvature of the adjacent face 12a of carrier plate 12. The axes of the cylindrical surfaces of support 11 and carrier plate 12 are substantially vertical when holder 10 is in the position of use represented in FIGURE 3.

In order to lower the receiver 13 from a cantilevered up position with respect to plate 11, the receiver is rotated and carrier plate 12 accordingly also rotates, the rotation being about the axis of bolt 15 and is tolerated by the curved face of support 11 and the corresponding curved face of carrier plate 12 being cammed apart by their relative movement against the bias of helical spring 16. After the hinge 14, which also moves with the receiver 13 and carrier 12 about pivot pin 15, has traveled approximately 180 degrees from the position indicated in FIGURES 1 and 3 of the drawing, the hinge will occupy a lowermost position and is beneath the longitudinal axis of receiver 13, at which time spring 16 once more biases carrier plate 12 into interlock with the substantially vertical plate 11, this being tolerated by the fact that the cylindrical faces 11a and 12a of the plates have once more come into a position of registration. An interlock therefore is sustained against the bias of spring 16. With the hinge 14 disposed beneath the axis of receiver 13, the receiver is free to rotate to a full down position on hinge 14 and this position is clearly represented in FIGURE 2 of the drawing. In the down position the receiver 13 is out of the way and the holder 10 can be worn in this condition by the fisherman until it is needed for use in the up position for supporting the fishing rod. Before installing the rod in the receiver 13, the receiver is grasped and rotation is applied to carrier 12 about the axis of pivot bolt 15 until hinge 14 is rotated through approximately 180 degrees to the position indicated in FIGURES 1 and 3, at which time the axis of hinge 14 is above the longitudinal axis of the receiver 13. Spring 16 is effective for forcing carrier plate 12 against support 11 with the curved faces 11a and 12a of these two members once more registered and interlocked so that the carrier 12 will not inadvertently rotate. The fishing rod then may be inserted butt end first into the socket afforded by the receiver 13 and accordingly the axis of the rod where supported is substantially coaxial with the longitudinal axis of the receiver. The angle at which the receiver 13 is supported in the up position as a cantilever by plate 11 (see FIGURE 1) is controlled by how far the receiver is permitted to rotate downward on hinge 14 before the inner end 13 beneath the hinge encounters abutment which prevents further movement toward plate 11. The longitudinal axis of the receiver preferably is sustained upwardly inclined with respect to the substantially vertical plate when receiver 13 is in the cantilevered position. The hinging movement of receiver 13 is stopped by plate 11 through the intermediary of carrier plate 12 having an outside face 12b that is contacted by the inner end 13b of the receiver in the desired up position of the receiver.

Receiver 13 has a longitudinal slot 20 entering its outer end and extending backward toward the inner end of the receiver so as to accommodate post 26 of a spinning reel (see FIGURE 4) and the longitudinal slot has at least one transverse extension 21 into which the reel post 26 may be rotated by axial rotation of the fishing rod to which the reel is attached and thus the reel post serves to interlock the rod 23 with the cylindrical wall of the receiver 13. It is advantageous to provide receiver 13 with a further slot, slot 22, which also is a transverse extension of the longitudinal slot 20 and is situated at a different distance from the outer end 13a of the receiver 13 than slot 21. Slot 22 is of a different width dimension than slot 21 and readily accommodates a reel post of a casting reel as of the type indicated in FIGURE 3, and thus interlocks the rod with the receiver and prevents lengthwise escape of the rod. In certain instances, as in FIGURE 5, the receiver 13 is provided in two coaxial sections 13c and 13d which telescope one into the other. The outer section 13c of the telescoping units is conveniently an adaptor having slots 31 and 32 as transverse extensions of a longitudinal slot 33 entering the outer end of the adaptor. These slots serve the same purpose as slots 20, 21, and 22 except that by sliding section 13c with respect to section 13d the slots 31 and 32 may be set to different positions lengthwise of the receiver 13 to accommodate a reel post.

It is interesting to observe that in the so-called up position of the fishing rod holder 10 (see FIGURES 1 and 3) the rod receiving tube 13, while not rotatable downward from its cantilevered position until the carrier plate 2 is properly rotated, nevertheless is free to be rotated on the axis of hinge 14 in an upward direction beyond the up position. This is greatly beneficial because the fishing rod held in the receiver 13 thus can be played up and down above the position of cantilever support, which movement often is helpful in landing a fish.

Figure 7:
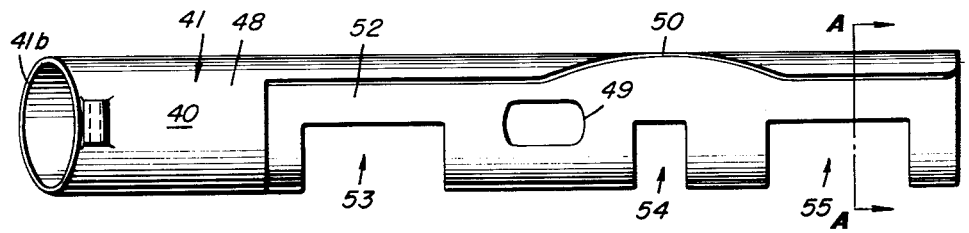
FIGURE 7 is a top view of the receiver component of the holder represented in FIGURE 6.
Figure 8:
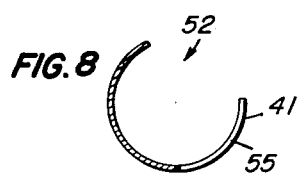
FIGURE 8 is a transverse section of the receiver, taken along A—A in FIGURE 7.
Figure 9:
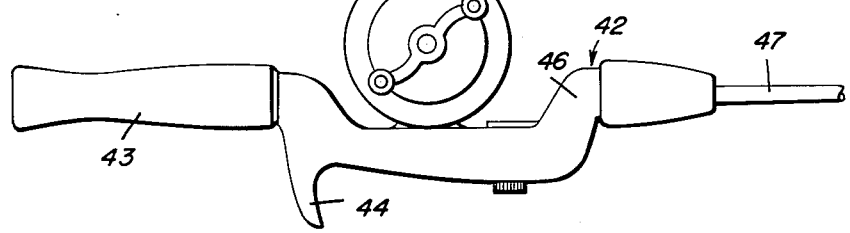
FIGURE 9 is a side view of the handle end of a bait type casting rod which for example is accommodated by the holder in FIGURE 6.

A modified form of fishing rod holder provided in accordance with the present invention is represented in FIGURE 6 and generally designated by reference numeral 40. Referring now to FIGURES 6, 7, and 8, it will be seen that the holder 40 includes a receiver 41 which is adapted to accommodate a fishing rod 42 equipped with a fingerpiece 44 projecting generally radially from the underneath side of handle 43, and a reel 45 attached in any suitable manner to the handle so as to occupy a top position. The rod 41 may for example be a bait casting unit of the well known type illustrated in FIGURES 6 and 9, in which the handle 43 has a forward, upwardly raised, offset portion 46 in advance of the reel and suitably attached to the rod. Receiver 41 is oblong, being generally cylindrical and tubular in form and includes a rear portion 48 for receiving the butt end of the fishing rod handle 43 and restraining the handle against escape in all lateral directions. Rod butt end restraining portion 48 advantageously is an annular tubular rear end of the receiver 41. The body wall of receiver 41 has a bottom aperture 49 substantially forward of the rod butt end restraining portion 48, which aperture accommodates fingerpiece 44. The top side of receiver 41 is open as by having a wide longitudinal slot extending forward from rod butt end receiving portion 48 and over aperture 49. The width of slot 52 in this vicinity is sufficient to accommodate lateral insertion of the butt end of handle 43 into the receiver. Thus, to dispose fishing rod 42 in fishing position in the receiver 41, the butt end of the handle 43 is inserted laterally downward through slot 52, and fingerpiece 44 through aperture 49. Aperture 49 is of sufficient extent in the direction of the length of receiver 41 for handle 43 to be moved lengthwise into the butt end receiving portion 48 while fingerpiece 44 is in aperture 49. The rod handle 43 once moved back into portion 48 accordingly cannot escape until the rod has been moved lengthwise in the reverse direction for the handle to clear portion 48, after which the handle may be lifted laterally out of the receiver through slot 52.

A carrier plate and supporting plate unit constructed and operating as already described with reference to FIGURES 1, 2, and 3 is combined with the rod receiver 41, to produce the holder 40, and for this purpose a hinge portion 14b' conveniently is added at rear edge of the receiver on top the rod butt restraining portion 48 and is connected to the carrier plate to form a hinge 14' structurally and functionally akin to hinge 14 in the preceding embodiment. The structure and operation in this regard, having previously been made clear in connection with the preceding embodiment, will not be repeated.

By having slot 52 enter the outer end of the receiver and extend back to the rod butt end receiving portion 48, fishing rods supporting post type reels also may be accommodated. The longitudinal slot 52 usually is provided with spaced transverse extension slots 53, 54, and 55 in the receiver wall for different reel posts in the sense of slots 21 and 22 in FIGURE 1. Slots 53 and 54 are of differing widths and slot 55 conveniently is added to afford still another interlock position for a reel post, along the length of the receiver. The body of the receiver may be relieved or indented at 50 just forward of fingerpiece aperture 49, thus forward position being where reel 45 is to be situated, and the relief being so that the butt end of the rod handle 43 may more nearly attain axial alignment with the longitudinal axis of the receiver when the rod 42 is supported in fishing position in the receiver. The zone of relief 50 is conveniently produced by cutting away a portion of that edge of the receiver wall which is opposite the edge where notches 53, 54, and 55 enter. Under these conditions, the longitudinal slot 52 is widened in the relief zone 50.

Thus it will be seen that in this invention a highly useful fishing rod holder is provided with which the various objects noted herein together with many thoroughly practical advantages are achieved. It will be seen that the holder may be utilized under any of a variety of fishing conditions and that embodiments of the holder may be readily produced either for attachment to the body of the fisherman or for that matter to some other mounting such as a portion of a boat.

As many possible embodiments of the invention may be made and as many changes may be made in the embodiments hereinbefore set forth, it will be distinctly understood that all matter described herein is to be interpreted as illustrative and not as a limitation.

I claim:

1. A fishing rod holder comprising a receiver having an end and a longitudinal axis, a hinge on said receiver having a hinge axis extending laterally of said end of the receiver, and means for supporting said receiver, including a substantially vertical plate and a pivotal connection between said hinge and plate affording a pivot axis transverse to the axis of said hinge for said receiver whereby said receiver may be rotated to positions relative to said substantially vertical plate where, respectively, said end of the receiver is disposed below the axis of the hinge and said end is disposed above the axis of the hinge, and said means affording an abutment transverse to said end of the receiver to stop downward rotation of the receiver about the axis of the hinge by contact with said end when the latter is disposed below the axis of the hinge and said receiver has its longitudinal axis extending outward in a transverse relation to said plate, said receiver having rotational freedom on the axis of the hinge upward from the latter position and back to said position, and said receiver being rotatable downwardly about said hinge axis when said end is disposed above the axis of the hinge, to a position where the longitudinal axis of the receiver is substantially vertical.

2. A fishing rod holder comprising a receiver having an end and a longitudinal axis, means for supporting said receiver, including a substantially vertical plate, a carrier, and a pivotal connection between said carrier and plate affording a pivot axis, a hinge between and interconnecting said receiver and carrier and having a hinge axis transverse to the longitudinal axis of the receiver and transverse to the axis of said pivot, said receiver, hinge and carrier being rotatable about the axis of said pivot and relative to said substantially vertical plate to positions where, respectively, said end of the receiver is disposed below the axis of the hinge and said end is disposed above the axis of the hinge, said means affording an abutment transverse to said end of the receiver to stop downward rotation of the receiver about the axis of the hinge by contact with said end when the latter is disposed below the axis of the hinge and said receiver has its longitudinal axis extending outward in a transverse relation to said plate, said receiver having rotational freedom on the axis of the hinge upward from the latter position and back to said position, and said receiver being rotatable downwardly about said hinge axis when said end is disposed above the axis of the hinge, to a position where the longitudinal axis of the receiver is substantially vertical, and means for interlocking said carrier and plate; said last named means being rotated on the axis of said pivot to a position corresponding to where said end of the receiver is disposed below the axis of the hinge, said interlocking means being operable to permit disengagement of said carrier and plate for said carrier to be rotated on the axis of said pivot to a position corresponding to where said end of the receiver is disposed above the axis of the hinge.

3. A fishing rod holder comprising a substantially vertical support, a receiver having a longitudinal axis and an inner end adjacent to said support, a carrier for said receiver, a hinge interconnecting the receiver at said inner end and said carrier and having an axis transverse to the longitudinal axis of the receiver, said support and carrier having curved faces formed to resemble a segment of a cylinder confronting each other so as to interengage against rotation when registered, a pivotal interconnection between said support and carrier and including a connector having a spring thereon biasing said carrier and support together, said connector affording a pivotal axis transverse to the axis of said hinge and about which pivotal axis said carrier, hinge and receiver may be rotated against the bias of said spring from registered engagement of the segmental cylindrical faces, said receiver in said registered engagement of said carrier and support being cantilevered in an up position with said end of the receiver rotated into an abutment on said support transverse to said end and beneath said hinge, thus preventing downward rotation of said receiver about said hinge, said receiver being rotatable in an up direction on said hinge from the latter position and back to said latter position, and said receiver in the other of said positions of registered engagement of the cylindrical faces of the carrier and support being in a location relative to said support where said end thereof is disposed above said hinge and said receiver rotates downward about the axis of said hinge to a position in which the longitudinal axis of the receiver is generally vertical.

4. A fishing rod holder comprising a substantially vertical support, a receiver having a longitudinal axis and an inner end adjacent to said support, a carrier for said receiver, a hinge interconnecting the receiver at said inner end and said carrier and having an axis transverse to the longitudinal axis of the receiver, said support and carrier having adjacent male and female faces to interengage against rotation when properly registered, a pivotal interconnection between said support and carrier and including a connector having a spring thereon biasing said carrier and support together, said connector affording a pivot axis transverse to the axis of said hinge and about which pivot axis said hinge and receiver may be rotated against the bias of said spring from registered engagement of said faces to an approximately 180 degree removed location, said receiver in said position of registered engagement of said carrier and support being cantilevered in an up position with said end of the receiver rotated into abutment with said carrier transverse to said end and beneath said hinge, thus preventing downward rotation of said receiver about said hinge, said receiver being rotatable in an up direction on said hinge from the latter position and back to said latter position, and said receiver in said approximately 180 degree removed location being in a location relative to said support where said end thereof may be disposed above said hinge and said receiver may be rotated downward about the axis of said hinge to a position in which the longitudinal axis of the receiver is generally vertical.

5. A holder for a fishing rod having a reel post attached thereto and a reel on said post, said holder comprising an oblong tubular receiver having a longitudinal axis, a wall of said receiver being adapted for laterally supporting the butt end of a fishing rod when said butt end is inserted inside said wall along said axis, said receiver having inner and outer ends, the wall of said receiver having a reel post accommodating slot entering the outer end and extending back toward said inner end, and at least one transverse extension of said slot for the reel post to enter for separably connecting said receiver with the fishing rod, a substantially vertical support, a carrier for said receiver, a hinge interconnecting said carrier and the inner end of said receiver and having an axis transverse to the longitudinal axis of the receiver, said support and carrier having adjacent male and female faces to interengage against rotation when properly registered, a pivotal interconnection between said support and carrier and including a connector having a spring thereon biasing said carrier and support together, said connector affording a pivot axis transverse to the axis of said hinge and about which pivot axis said hinge and receiver may be rotated against the bias of said spring from registered engagement of said faces to an approximately 180 degree removed location, said receiver in said position of registered engagement of said carrier and support being cantilevered in an up position with said end of the receiver rotated into abutment with said support transverse to said end and beneath said hinge, thus preventing downward rotation of said receiver about said hinge, said receiver being rotatable in an up direction on said hinge from the latter position and back to said latter position, and said receiver in said approximately 180 degree removed location being in a location relative to said support where said end thereof is disposed above said hinge and said receiver may be rotated downward about the axis of said hinge to a position in which the longitudinal axis of the receiver is generally vertical.

6. A fishing rod holder comprising a substantially vertical support, a receiver having a longitudinal axis and an inner end adjacent to said support, a carrier for said receiver, a hinge interconnecting the receiver at said inner end and said carrier and having an axis transverse to the longitudinal axis of the receiver, a pivotal interconnection between said support and carrier affording a pivot axis transverse to the axis of the hinge and about which pivot axis said hinge and receiver may be rotated between approximately 180 degree removed locations, said interconnection including a spring biasing said carrier and support together in interfacial contact so that relative rotation between said carrier and support about said pivotal interconnection is resisted, said receiver in one of said locations being cantilevered in an up position with said end of the receiver rotated into abutment with said support transverse to said end and beneath said hinge, thus preventing downward rotation of the receiver about said hinge, said receiver being rotatable in the up direction on said hinge from the latter position and back to said latter position, and said receiver in the other of said locations being rotatable to dispose said end of the receiver above said hinge whereby said receiver may be rotated downward about the axis of the hinge to a position where the longitudinal axis of the receiver is generally vertical.

References Cited in the file of this patent

UNITED STATES PATENTS

| | | |
|---|---|---|
| 2,144,122 | Pflueger | Jan. 17, 1939 |
| 2,232,107 | Gall | Feb. 18, 1941 |
| 2,529,148 | Fratt | Nov. 7, 1950 |
| 2,576,624 | Miller | Nov. 27, 1951 |
| 2,658,650 | Jasper | Nov. 10, 1953 |
| 2,704,412 | Davis | Mar. 22, 1955 |
| 2,709,544 | Barringer | May 31, 1955 |
| 2,742,210 | Bortz et al. | Apr. 17, 1956 |
| 2,756,954 | Whitlow | July 31, 1956 |